United States Patent Office 3,211,713
Patented Oct. 12, 1965

3,211,713
PROCESS FOR MODIFYING HYDROCARBON POLYMERS WITH LOWER ALIPHATIC MONOAZIDOFORMATES
David S. Breslow, Wilmington, Del., assignor to Hercules Powder Company, Wilmington, Del., a corporation of Delaware
No Drawing. Filed Oct. 15, 1962, Ser. No. 230,630
14 Claims. (Cl. 260—93.7)

This invention relates to a process of modifying polymers and to the polymers so modified. In particular, this invention relates to the process of modifying hydrocarbon polymers with lower aliphatic monoazidoformates and to the polymers so modified.

Recent improvements in the art of polymerization have enabled the production of a large number of hydrocarbon polymers having a variety of uses. All of these polymers, while excellent for many uses, are difficult to dye, emulsify, adhere to other materials, etc. It has been hypothesized that the reason for these difficulties is the lack of polar groups in the polymers.

Now in accordance with this invention, it has been found that hydrocarbon polymers can be modified with aliphatic monoazidoformates having the general formula

where R is an aliphatic radical containing from 1 to 3 carbon atoms to produce products having increased susceptibility toward the application of dyes, coatings, adhesives, as well as improved printability and emulsifiability. The modification of this invention is particularly advantageous in the preparation of hydrocarbon polymer films and fibers of improved dyeability. In addition, it has been found that hydrocarbon polymers modified in accordance with this invention make excellent lubricant additives.

Any lower aliphatic monoazidoformate as defined above can be used in the process of this invention. Exemplary of the monoazidoformates that can be used are n-propyl azidoformate, isopropyl azidoformate, ethyl azidoformate, monofluoroethyl aziodoformate, methyl azidoformate, etc. The only restrictions on the type of azidoformate used in the process of this invention is that it be substituted with only one azidoformate group and contain from 1 to 3 carbon atoms (exclusive of the azidoformate group).

Any type of hydrocarbon polymer, including saturated, unsaturated, linear atactic, crystalline or nonlinear amorphous polymers as, for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other or nonhydrocarbon polymers can be modified in accordance with this invention. The hydrocarbon polymer to be modified can be in any desired form as, for example, flake, fiber, film, etc.

The modification process of this invention can be carried out by either heating the hydrocarbon polymer in the presence of the aliphatic monoazidoformate to a temperature at which the azidoformate decomposes or by exposing the polymer in the presence of the aliphatic monoazidoformate to irradiation. The temperature at which modification is effected can be varied over a wide range. When modification is effected by heating, the temperature varies from about 90° C. to about 300° C. When modification is effected by irradiation, it is independent of temperature and can be performed at or below room temperature. Under irradiation conditions, the rate of the reaction depends on the intensity of the light source and the distance of the polymer therefrom. The wave lengths used will generally be in the range of from about 1 A. to about 5800 A., most preferably from about 2000 A. to about 3000 A. This irradiation can be supplied by sources such as low and high pressure mercury vapor lamps, cathode ray tubes, etc. Various amounts of the aliphatic monoazidoformate modifying agent can be added, the optimum amount depending on the desired degree of modification, the specific monoazidoformate employed, etc. In general, the amount added, based on the weight of the hydrocarbon polymer, will be from about 0.001% to about 20%.

The aliphatic monoazidoformate modifying agent can be incorporated with the hydrocarbon polymer in any desired fashion. For some applications, it may be desirable to blend the modifier and hydrocarbon polymer. In such cases, a uniform blend can be obtained by simply milling on a conventional rubber mill or dissolving the monoazidoformate in a solution containing the polymer and evaporating the solvent. For other applications, a surface modification of the polymer may be desired. In such cases, the polymer to be treated can be dipped into a solution of the monoazidoformate or a solution of the monoazidoformate can be sprayed or painted on the surface of the polymer. Other methods of blending the modifying agent with the polymer or coating the surface of the polymer with the modifying agent will be apparent to those skilled in the art.

In addition to the modifying agent, other ingredients can also be incorporated as, for example, extenders, fillers, pigments, plasticizers, stabilizers, etc. When the modification is effected by irradiation, additives should be used in amounts which do not inhibit the passage of the radiation. Obviously, there are many cases in which additives are not required or desired and excellent results are achieved when only the modifying agent is added.

The following examples are presented for purposes of illustration, parts and percentages being by weight unless otherwise specified. The molecular weight of some of the polymers in the examples is indicated by their reduced specific viscosity (RSV). By the term "reduced specific viscosity" is meant the $\eta_{sp/c}$ determined on a 0.1% solution (0.1 g. of the polymer per 100 ml. of solution) of the polymer in decahydronaphthalene at a temperature of 135° C.

Example 1

Into a solution of 4.2 parts of ethyl azidoformate in methylene chloride was dipersed 70 parts of a polyethylene flake having an RSV of 2.1. After thorough mixing, the solvent was removed under vacuum. The dry flake was then heated for 24 hours at a temperature of 100° C. under an atmosphere of nitrogen at 57 p.s.i. pressure. The resulting product was extracted with chloroform to remove unreacted azidoformate and decomposition products of unreacted azidoformate. After drying, the polymer was analyzed and found to contain 0.21% by weight of nitrogen.

Example 2

A 3 x 7 inch knitted swatch of polypropylene fibers having an RSV of 4.0 was thoroughly washed, rinsed in distilled water and dried. The dried swatch was then soaked in a solution of isopropyl azidoformate (0.19 g./cc.) in methylene chloride for six hours at room temperature. The thus treated swatch was air dried and then heated in an autoclave in a nitrogen atmosphere for five hours at a temperature of 115° C. under a pressure of 50 p.s.i. The swatch was extracted with chloroform to remove unreacted azidoformate and decomposition products of unreacted azidoformate. After drying, the modified material was analyzed and found to contain 0.5% by weight of nitrogen. The modified material was tested for ease of dyeability with dispersed dyes and found to be improved 50% over a sample of the unmodified material. Increased dyeability was obtained using both basic and acid dyes.

*Example 3*

A sample of polypropylene film of 8 mil thickness, having an RSV of 3.5, was soaked in a 15% solution of n-propyl azidoformate in methylene chloride for 5 hours at room temperature. After air drying, the film was irradiated for 2 hours with a low-pressure mercury vapor light (36 watt) at a distance of 3.75 inches at room temperature. The thus treated film was extracted with chloroform for the reasons stated in the above examples. The modified film was analyzed and found to contain 0.26% by weight of nitrogen. Testing showed that dissipation of electrostatic charges was much more rapid on the modified film that on untreated film.

What I claim and desire to protect by Letters Patent is:

1. The process of modifying a hydrocarbon polymer which comprises heating said polymer at an elevated temperature with from about 0.001% to about 20% of an aliphatic monoazidoformate having the general formula $$ROCN_3$$
(with C=O)

where R is an aliphatic radical containing from 1 to 3 carbon atoms.

2. The process of claim 1 wherein the aliphatic monoazidoformate is ethyl azidoformate.
3. The process of claim 1 wherein the aliphatic monoazidoformate is isopropyl azidoformate.
4. The process of claim 1 wherein the hydrocarbon polymer is polypropylene.
5. The process of modifying a hydrocarbon polymer which comprises irradiating said polymer in admixture with from about 0.001% to about 20% of an aliphatic monoazidoformate having the general formula

where R is an aliphatic radical containing from 1 to 3 carbon atoms at a wave length between about 1 A. and about 5800 A.

6. The process of claim 5 wherein the hydrocarbon polymer is polypropylene.
7. The process of claim 5 wherein the aliphatic monoazidoformate is n-propyl azidoformate.
8. A hydrocarbon polymer modified by treatment with from about 0.001% to about 20% of an aliphatic monoazidoformate having the general formula

where R is an aliphatic radical containing from 1 to 3 carbon atoms at an elevated temperature.

9. The product of claim 8 wherein the hydrocarbon polymer is polypropylene.
10. The product of claim 8 wherein the aliphatic monoazidoformate is ethyl azidoformate.
11. The product of claim 8 wherein the aliphatic monoazidoformate is isopropyl azidoformate.
12. A hydrocarbon polymer modified by treatment with from about 0.001% to about 20% of an aliphatic monoazidoformate having the general formula

where R is an aliphatic radical containing from 1 to 3 carbon atoms under irradiation at a wave length between about 1 A. and about 5800 A.

13. The product of claim 12 wherein the hydrocarbon polymer is polypropylene.
14. The product of claim 12 wherein the aliphatic monoazidoformate is n-propyl azidoformate.

No references cited.

JOSEPH L. SCHOFER, *Primary Examiner.*